United States Patent
Wu et al.

(10) Patent No.: US 9,913,255 B2
(45) Date of Patent: Mar. 6, 2018

(54) TIME DOMAIN MULTIPLEXING UL TRANSMISSION ON MULTIPLE SERVING CELLS FOR A MOBILE STATION WITH SINGLE TRANSMITTER

(71) Applicant: MediaTek Singapore Pte. Ltd., Singapore (SG)

(72) Inventors: Min Wu, Beijing (CN); Xiangyang Zhuang, Lake Zurich, IL (US); Chien-Hwa Hwang, Hsinchu County (TW); Shiang-Jiun Lin, Hsinchu (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 182 days.

(21) Appl. No.: 14/769,454

(22) PCT Filed: Jan. 28, 2015

(86) PCT No.: PCT/CN2015/071751
§ 371 (c)(1),
(2) Date: Aug. 21, 2015

(87) PCT Pub. No.: WO2015/113499
PCT Pub. Date: Aug. 6, 2015

(65) Prior Publication Data
US 2016/0014753 A1    Jan. 14, 2016

(30) Foreign Application Priority Data
Jan. 28, 2014  (CN) .......................... 2014 1 0042110

(51) Int. Cl.
*H04W 72/04*    (2009.01)
*H04L 5/00*     (2006.01)
(Continued)

(52) U.S. Cl.
CPC ........ *H04W 72/0406* (2013.01); *H04B 7/022* (2013.01); *H04L 1/1812* (2013.01);
(Continued)

(58) Field of Classification Search
None
See application file for complete search history.

(56) References Cited

U.S. PATENT DOCUMENTS

2008/0189360 A1    8/2008 Kiley
2010/0035627 A1*   2/2010 Hou ....................... H04B 7/024
                                                           455/452.2

(Continued)

FOREIGN PATENT DOCUMENTS

CN    103109479 A    5/2013
WO    2010145873 A1  12/2010
(Continued)

OTHER PUBLICATIONS

Catt, L1 support for dual connectivity, 3GPP TSG RAN WG1 Meeting #74, R1-133026, XP050716255, Aug. 19-23, 2013, pp. 1-3, Barcelona, Spain.

(Continued)

*Primary Examiner* — Diane Lo
(74) *Attorney, Agent, or Firm* — Winston Hsu

(57) ABSTRACT

Apparatus and methods are provided for TDM uplink transmission on multiple serving cells with single transmitter. In one novel aspect, the UE selects a serving cell for an UL transmission subframe based on a TDM selection rule. In one embodiment, the switching rule involves identifying one or more serving cells with a highest UL transmission priority and a serving-cell priority rule. In another novel aspect, the UE drops a selected part of the UL transmission within the overlap region based on one or more switching rules, which include dropping a last OFDM symbol, dropping a portion
(Continued)

of a last OFDM symbol of the SRS with combing structure, dropping a partial CP of a first OFDM symbol of the second serving cell, and dropping a partial tail of a last OFDM symbol of the first serving cell and partial CP of a first OFDM symbol of the second serving cell.

14 Claims, 8 Drawing Sheets

(51) Int. Cl.
| | |
|---|---|
| H04W 48/20 | (2009.01) |
| H04B 7/022 | (2017.01) |
| H04L 1/18 | (2006.01) |
| H04L 5/14 | (2006.01) |
| H04L 5/22 | (2006.01) |
| H04L 27/26 | (2006.01) |
| H04W 16/32 | (2009.01) |
| H04W 72/12 | (2009.01) |
| H04W 74/08 | (2009.01) |
| H04W 88/02 | (2009.01) |

(52) U.S. Cl.
CPC .............. *H04L 5/00* (2013.01); *H04L 5/14* (2013.01); *H04L 5/22* (2013.01); *H04L 27/2607* (2013.01); *H04W 16/32* (2013.01); *H04W 48/20* (2013.01); *H04W 72/0446* (2013.01); *H04W 72/12* (2013.01); *H04W 72/1289* (2013.01); *H04W 74/0833* (2013.01); *H04W 88/02* (2013.01)

(56) References Cited

U.S. PATENT DOCUMENTS

| | | | |
|---|---|---|---|
| 2011/0249578 A1* | 10/2011 | Nayeb Nazar | ........ H04L 1/0027 370/252 |
| 2012/0135731 A1* | 5/2012 | Rangaiah | .............. H04W 48/20 455/434 |
| 2012/0140690 A1 | 6/2012 | Choi | |
| 2013/0258874 A1* | 10/2013 | Khoshnevis | .......... H04L 5/0057 370/252 |
| 2014/0057632 A1* | 2/2014 | Hole | ..................... H04W 36/30 455/436 |
| 2014/0140315 A1 | 5/2014 | Kim | |
| 2015/0117275 A1* | 4/2015 | Park | ...................... H04L 1/1812 370/280 |

FOREIGN PATENT DOCUMENTS

| | | |
|---|---|---|
| WO | 2013024997 A2 | 2/2013 |
| WO | 2014169459 A1 | 10/2014 |

OTHER PUBLICATIONS

Intel Corporation, Dual Connectivity for UEs supporting one UL CC, 3GPP TSG RAN WG2 Meeting #81bis, R2-131410, XP050699530, Apr. 15-19, 2013, Chicago, USA.

"International Search Report" dated Apr. 15, 2015 for International application No. PCT/CN2015/071751, International filing date:Jan. 28, 2015.

* cited by examiner

TIME DOMAIN MULTIPLEXING UL TRANSMISSION ON MULTIPLE SERVING CELLS FOR A MOBILE STATION WITH SINGLE TRANSMITTER

CROSS REFERENCE TO RELATED APPLICATIONS

This application claims priority under 35 U.S.C. § 111(a) and is based on and hereby claims priority under 35 U.S.C. § 120 and § 365(c) from Chinese Application No. 201410042110.4, entitled "TIME DOMAIN MULTIPLEXING UL TRANSMISSION ON MULTIPLE SERVING CELLS FOR A MOBILE STATION WITH SINGLE TRANSMITTER" filed on Jan. 28, 2014.The subject matter of which is incorporated herein by reference.

TECHNICAL FIELD

The disclosed embodiments relate generally to wireless communication, and, more particularly, to time-domain multiplexing uplink transmission on multiple serving cells for a mobile station with single transmitter.

BACKGROUND

Third generation partnership project (3GPP) and Long Term Evolution (LTE) mobile telecommunication systems provide high data rate, lower latency and improved system performances. In existing Dual Connectivity (DC) and UL Carrier Aggregation (CA) system, mobile station is required to be equipped with at least dual transmitters. If a mobile station with dual receivers and single transmitter is configured with DC or UL CA, some benefits could be obtained. For example, the DL data rate of the mobile station could be improved by a DC system, and the UL data rate of the mobile station could be improved by a TDD-FDD CA system wherein TDD is Pcell and FDD is Scell. Thus, it is necessary for the mobile station to transmit UL on multiple serving cells with a Time Domain Multiplexing (TDM) pattern. Improvements and enhancements are required for TDM UL multiplexing for UEs with multiple receivers and a single transmitter.

SUMMARY OF THE INVENTION

Apparatus and methods are provided for TDM uplink transmission on multiple serving cells for a mobile station with single transmitter. In one novel aspect, the mobile station is configured with multiple serving cells, wherein uplink (UL) transmissions are transmitted sequentially over multiple serving cells to different base stations using time domain multiplexing (TDM) and selects a serving cell for an UL transmission subframe based on a TDM selection rule. The mobile station performs an UL transmission to the selected serving cell for the subframe. In one embodiment, the switching rules involves identifying one or more serving cells with a highest UL transmission priority for the UL transmission subframe; selecting a serving cell with the highest UL transmission priority if there is only one identified serving cell; and selecting a serving cell with a highest serving cell priority among the identified serving cells if there are multiple serving cells with the highest UL transmission priority. In another embodiment, the UL transmission priorities are predefined with descending order comprising: PUSCH, SR, DL HARQ-ACK, periodic CSI, SRS, PRACH triggered by a base station, and PRACH triggered by the UE. In yet another embodiment, the serving cell priorities are predefined, wherein a primary cell (PCELL) has the highest priority, and wherein a secondary cell (SCELL) with small serving cell index has a higher priority than an SCELL with a bigger serving cell index.

In another novel aspect, the mobile station transmits an UL transmission over a first serving cell with a first UL time advance (TA) value and subsequently switches the UL transmission to a second serving cell with a second UL TA value, wherein the first UL TA value is different from the second UL TA value resulting in an overlap region of OFDM symbols. The mobile station drops a selected part of the UL transmission within the overlap region based on one or more switching rules. In one embodiment, the selected part of the UL transmission to be dropped is a last OFDM symbol within the overlap region to be transmitted to the first serving cell. In another embodiment, a last OFDM symbol to the first serving cell is configured for sounding reference signal (SRS) with combed structure, and wherein the selected part of UL transmission to be dropped is a partial symbol of the SRS within the overlap region. In yet another embodiment, the selected part of UL transmission to be dropped is a partial cyclic prefix (CP) of a first OFDM symbol of the second serving cell. In one embodiment, the selected part of UL transmission to be dropped consists a partial tail of a last OFDM symbol of the first serving cell and partial cyclic prefix (CP) of a first OFDM symbol of the second serving cell.

Other embodiments and advantages are described in the detailed description below. This summary does not purport to define the invention. The invention is defined by the claims.

BRIEF DESCRIPTION OF DRAWINGS

The accompanying drawings, where like numerals indicate like components, illustrate embodiments of the invention.

DETAILED DESCRIPTION

Figure 1:
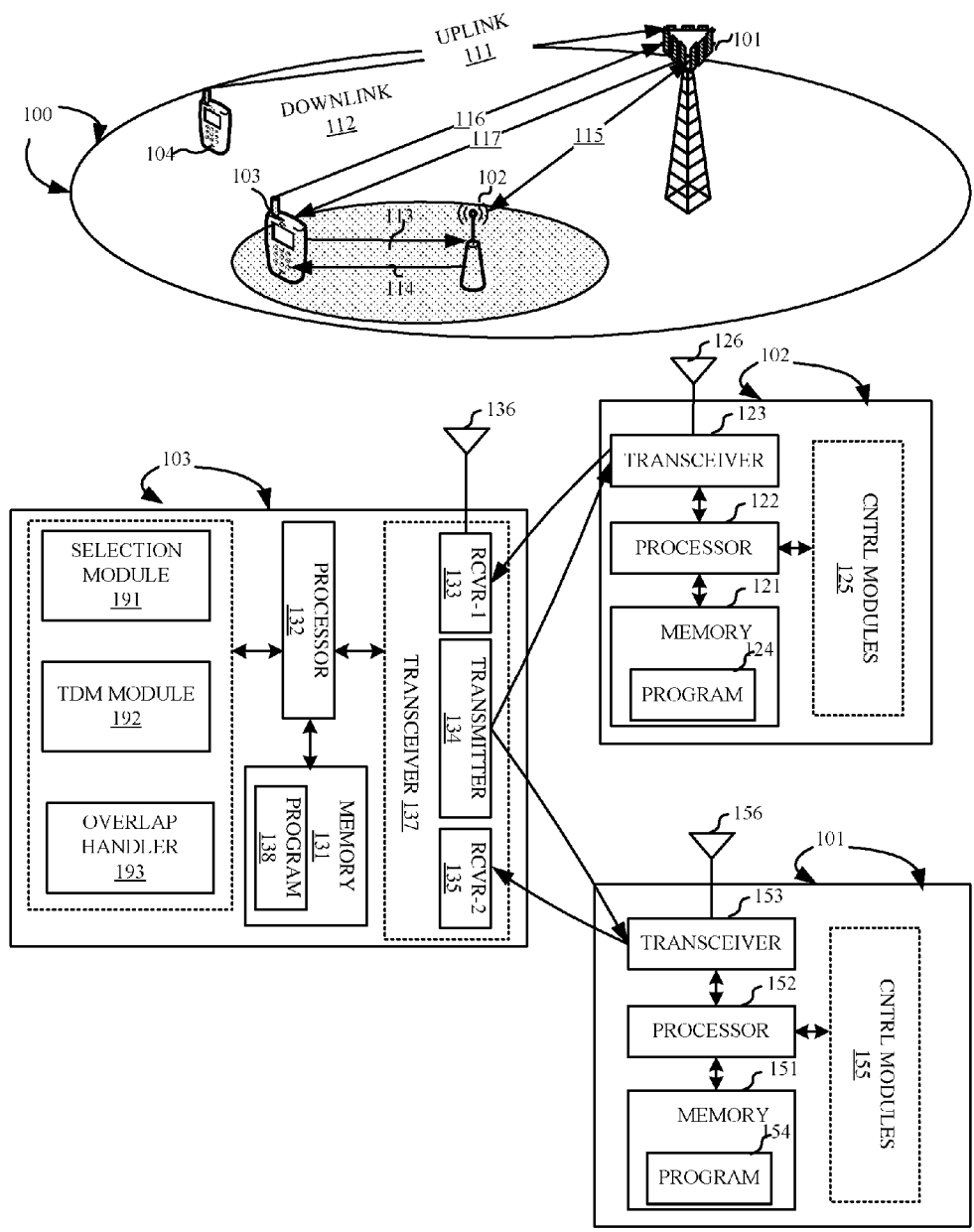
FIG. 1 illustrates an exemplary mobile communication network in accordance with embodiments of the current invention.

Reference will now be made in detail to some embodiments of the invention, examples of which are illustrated in the accompanying drawings.

In current TDD-FDD CA system, assuming TDD is Pcell and FDD is Scell, DL HARQ-ACK of FDD Scell is transmitted on TDD Pcell and a reference configuration is followed for DL HARQ-ACK timing of FDD Scell, i.e. only Pcell PUCCH is allowed to transmit UCI. Another straightforward solution is to allow DL HARQ-ACK of FDD SCell to be transmitted via PUCCH on FDD SCell, which is the SCell PUCCH. Thus, the DL HARQ timing of the FDD SCell can follow the rule of the FDD SCell. For a both DL and UL CA capable UE, simultaneous PUCCH transmission on PCell and SCell can be supported. However, for a DL CA capable and UL non-CA capable UE, which has the capability of simultaneous reception on TDD PCell and FDD SCell but does not have the capability of simultaneous transmission on TDD PCell and FDD SCell, only TDM PUCCH transmission on PCell and SCell can be supported. TDM PUCCH transmission can simplify the DL HARQ issue of FDD SCell and enjoy the benefits of FDD DL HARQ timing, such as low latency and distributed DL HARQ-ACK report. In addition, TDM PUSCH transmission can exploit the FDD-UL subframe corresponding to TDD-DL subframe to improve UL data throughput. Therefore, the TDM UL transmission is very beneficial for the UE that is DL CA capable and UL non-CA capable.

In a DC (Dual Connectivity) system, which is also actively discussed in 3GPP Rel-12 topic SCE (Small Cell Enhancements), the backhaul between Macro cell and Small cell may be non-ideal considering realistic network deployment and cost. Thus, UL control information needs be separately transmitted to Macro cell and Small cell, e.g. DL HARQ-ACK and periodic CSI report. For a mobile station with multiple receivers and single transmitter, which have the capability of simultaneous reception on Macro cell and Small cell but can only receive sequentially from Macro cell and Small cell, TDM UL transmission between Macro cell and Small cell is needed. Based on the above discussion, TDM UL transmission on multiple serving cells is necessary and/or beneficial for a mobile station with a single transmitter under some special scenarios.

A main problem of TDM UL transmission is how to select one serving cell used for UL transmission in one subframe. The selection of a serving cell for UL transmission may be based on semi-static or dynamic TDM pattern. Another problem is how to switch UL transmission between two serving cells with different carrier frequencies. Due to the difference of propagation distance, the UL TA (Timing Advance) value to each activated serving cell may be different. In addition, TDD special UL TA offset about 20 us may further enlarge the difference of the UL TA values corresponding to TDD serving cell and FDD serving cell. Due to the difference of UL TA values, UL transmission may be overlapped during UL switching. Corresponding solutions shall be proposed to resolve the UL transmission overlap issue. Therefore, it is very important to resolve these problems to support TDM UL transmission on multiple serving cells for the mobile station with single transmitter. The benefit of TDM UL transmission is not limited to the examples above.

FIG. 1 illustrates an exemplary mobile communication network 100 in accordance with embodiments of the current invention. Wireless communication system 100 includes one or more fixed base infrastructure units, such as base stations 101 and 102, forming a network distributed over a geographical region. The base unit may also be referred to as an access point, an access terminal, a base station, a Node-B, an eNode-B, or by other terminology used in the art. The one or more base stations 101 and 102 serve a number of mobile stations 103 and 104 within a serving area, for example, a cell, or within a cell sector. In particularly, base stations 101 and 102 are operated with different carrier frequencies and with same or different duplex mode, e.g. FDD mode and TDD mode. The two base stations simultaneously serve the mobile station 103 within their common coverage. A back haul connection 115 connecting the non-co-located base stations 101 and 102 can be either ideal or non-ideal. In another embodiment, the base station 101 and 102 can be co-located. In some systems, one or more base stations are communicably coupled to a controller forming an access network that is communicably coupled to one or more core networks. The disclosure, however, is not intended to be limited to any particular wireless communication system.

Serving base station 101 and 102 transmit downlink communication signals 112, 114 and 117 to mobile stations in the time and/or frequency domain. Mobile station 103 and 104 communicate with one or more base units 101 and 102 via uplink communication signals 111, 113 and 116. In one embodiment, mobile communication network 100 is an OFDM/OFDMA system comprising a base stations eNB 101 eNB 102 and a plurality of mobile station 103 and mobile station 104. When there is a downlink packet to be sent from eNodeB to mobile station, each mobile station gets a downlink assignment, e.g., a set of radio resources in a physical downlink shared channel (PDSCH). When a UE needs to send a packet to eNodeB in the uplink, the mobile station gets a grant from the eNodeB that assigns a physical downlink uplink shared channel (PUSCH) consisting of a set of uplink radio resources. The mobile station gets the downlink or uplink scheduling information from a physical downlink control channel (PDCCH) or an enhanced physical downlink control channel (EPDCCH) that is targeted specifically to that mobile station. The downlink or uplink scheduling information and the other control information, carried by PDCCH, is referred to as downlink control information (DCI). In current LTE system, PDCCH or EPDCCH is transmitted in one subframe and PDSCH is transmitted in the same subframe. PUSCH start to transmit four subframes after the subframe transmitting PDCCH or EPDCCH for FDD. For TDD, different subframe gaps between PUSCH and the PDCCH conveying the uplink scheduling information or corresponding or Physical Hybrid ARQ Indicator Channel (PHICH) are defined for different uplink-downlink configurations in 3GPP TS 36.213. More than one transmission timing interval (TTI) can be bundled for a PUSCH transmission.

In one embodiment, the communication system utilizes OFDMA or a multi-carrier based architecture including Adaptive Modulation and Coding (AMC) on the downlink and next generation single-carrier (SC) based FDMA architecture for uplink transmissions. SC based FDMA architectures include Interleaved FDMA (IFDMA), Localized FDMA (LFDMA), DFT-spread OFDM (DFT-SOFDM) with IFDMA or LFDMA. In OFDMA based systems, remotes units are served by assigning downlink or uplink radio resources that typically consists of a set of sub-carriers over one or more OFDM symbols. Exemplary OFDMA based protocols include the developing Long Term Evolution (LTE) of the 3GPP UMTS standard and IEEE 802.16 standard. The architecture may also include the use of spreading techniques such as multi-carrier CDMA (MC-CDMA), multi-carrier direct sequence CDMA (MC-DS-CDMA), Orthogonal Frequency and Code Division Multiplexing (OFCDM) with one or two dimensional spreading, or may be based on simpler time and/or frequency division multiplexing/multiple access techniques, or a combination of these various techniques. In alternate embodiments, communication system may utilize other cellular communication system protocols including, but not limited to, TDMA or direct sequence CDMA.

For a mobile station with multiple receiver and single transmitter, which has the simultaneous reception on multiple serving cells but does not have the simultaneous transmission on multiple serving cells, TDM UL transmission on multiple serving cells is necessary and/or beneficial. In one use case of DC system with non-ideal backhaul, TDM UL transmission is necessary to support separate report of UL control information, e.g. DL HARQ-ACK and periodic CSI report. In another use case of CA system with ideal backhaul, e.g. TDD cell as PCell and FDD cell as SCell, TDM UL transmission is beneficial for the improvement of UL throughput and the simplification of DL HARQ issue. Therefore, a method to support TDM UL transmission on multiple serving cells is required.

In one embodiment of the disclosure, a method for a mobile station with single transmitter to support TDM UL transmission on multiple serving cells include selecting one serving cell from multiple activated serving cells for UL transmission in one subframe; performing the UL transmission in the subframe on the selected serving cell. In one example, the UL transmission can be PUCCH used for transmission of UL control information (e.g. DL HARQ-ACK, periodic CSI and SR), and PUSCH used for UL data transmission, SRS (Sounding Reference Signal), and PRACH (Physical Random Access Channel).

In one embodiment, selecting one serving cell from multiple activated serving cells for UL transmission in one subframe further includes: selecting one serving cell based on semi-static TDM pattern; each serving cell is associated with one subframe set; there is no overlap between any two subframe sets, in one further example, the union set of all subframe sets includes each subframe; the serving cell associated with the subframe set including current subframe is selected. Here, semi-static TDM pattern means UL transmission can be transmitted only on a default or configured serving cell in one subframe. In one example, the subframe set associated with each serving cell is predefined. In another example, the subframe set associated with each serving cell is configured by a higher-layer message (e.g., Radio Resource Control (RRC) message or other messages in LTE system).

In the use case, wherein one serving cell is operated with TDD mode and another serving cell is operated with FDD mode, the subframe set associated with each serving cell is predefined. In one example, the subframe set associated with the FDD cell comprises one FDD-UL subframe corresponding to TDD-DL subframe of the TDD cell, and the subframe set associated with the TDD cell comprises one TDD-UL subframe and one special subframe of the TDD cell. Thus, there is no any UL transmission during the time of DwPTS and GP for the mobile station. In another example, the subframe set associated with the TDD cell comprises one TDD-UL subframe of the TDD cell, and the subframe set associated with the FDD cell comprises at least one other subframe, i.e., one FDD-UL subframe corresponding to TDD-DL subframe and one special subframe of the TDD cell. Thus, PRACH and SRS shall not be configured in UwPTS for the mobile station. In the use case, wherein both of the serving cells are operated with FDD mode, the subframe set associated with each serving cell is configured by a higher-layer message. In one example, the subframe set associated with one FDD serving cell is configured for odd subframes, such as subframe set {1, 3, 5, 7, 9}, and the subframe set associated with another FDD serving cell is configured for even subframes, such as subframe set {0, 2, 4, 6, 8}.

This kind of semi-static TDM pattern via subframe set association causes a restriction of UL scheduling, which is only UL subframes in the associated subframe set can be scheduled by corresponding serving cell. However, this kind of semi-static TDM pattern shall not restrict DL scheduling and DL HARQ timing may be adjusted to match corresponding UL subframe set. In CA system with ideal backhaul, DL HARQ timing is not impacted, i.e. same as other mobile station with multiple transmitters. If PUCCH can be transmitted on SCell, DL HARQ timing of SCell shall follow the rule of SCell. DL HAQR-ACK of SCell can be reported via SCell PUCCH if corresponding UL subframe is associated with SCell, or reported via PCell PUCCH if corresponding UL subframe is associated with PCell. In DC system with non-ideal backhaul, DL HARQ timing is impacted, i.e. different from other mobile station with multiple transmitters. Since DL HARQ-ACK needs to be separately reported, the DL HARQ-ACKs of all DL subframes shall be reported in the associated UL subframe set for each serving cell. The mechanism of DL HARQ-ACK report in TDD system can be reused in FDD system, e.g. DL HARQ-ACK bundling or multiplexing. Similar rule can be used to determine the DL HARQ timing, e.g. reporting DL HARQ-ACK in adjacent available UL subframes with a time interval larger than 4 ms.

In another embodiment, selecting one serving cell from multiple activated serving cells for UL transmission in one subframe further includes: selecting one serving cell based on dynamic TDM pattern; evaluating the priority of potential UL transmission on each serving cell; selecting the serving cell wherein corresponding UL transmission has the highest priority; evaluating the priority of these serving cells if potential UL transmissions on multiple serving cells have the same priority; selecting the serving cell with the highest priority among these serving cells with the same priority of potential UL transmissions. Here, dynamic TDM pattern means UL transmission can happen on any serving cell in one subframe. Potential UL transmission includes PUSCH, PRACH, SRS and PUCCH (e.g. DL HARQ-ACK, periodic CSI and SR). When these potential UL transmissions on different serving cells collide in the same UL subframe, the mobile station shall select one serving cell with the highest priority of potential UL transmission among these serving cells. In one example, the priority of potential UL transmission is predefined. If potential UL transmissions on multiple serving cells have the same priority, the priority of each serving cell can be further used to determine one serving cell for UL transmission.

In one example, the priority of potential UL transmission is predefined. PUSCH has the highest priority among all potential UL transmissions. SR has the second highest priority and higher priority than other UCI. DL HARQ-ACK has higher priority than periodic CSI. Periodic CSI has higher priority than SRS. PRACH has the lowest priority, and PRACH triggered by eNB has higher priority than PRACH triggered by UE. In one example, the priority of each serving cell is predefined. PCell has the highest priority, and one SCell with small serving cell index has higher priority than another SCell with large serving cell index. In another example, the priority of each serving cell is configured by a higher layer message.

In one embodiment of the disclosure, a method for a mobile station with single transmitter to support UL switching between two serving cells with different carrier frequencies includes: reporting the difference of UL TA values of the two serving cells if the backhaul between the two serving cells is non-ideal; dropping partial UL transmission within an overlap region of UL transmission during UL switching. Due to the difference of propagation distances to different serving eNBs, UL TA value of each serving cell may be different. In addition, TDD special TA offset further enlarges the difference of UL TA values of FDD and TDD serving cells. When UL transmission is switched to the serving cell with relatively large UL TA value from the serving cell with relatively small UL TA value, there is an overlap region of UL transmission during the UL switching. Therefore, dropping partial UL transmission within the overlap region is necessary.

In one embodiment, the subframe boundaries at TDD eNB and FDD eNB are synchronous. In one example, considering the large differences between TDD eNB and FDD eNB, the overlap region of UL transmission may be close to the length of one OFDM symbol. Thus, the last OFDM symbol of previous serving cell can be configured for blank. UL transmission can be mapped partial subframe except the last OFDM symbol, which is similar to the case that SRS transmission is configured for the last OFDM symbol. In another example, considering the small differences between TDD eNB and FDD eNB, the overlap region of UL transmission may be close to half or one third of the length of one OFDM symbol. SRS transmission with comb pattern can configured for the last OFDM symbol. Due to the comb pattern with a certain interval, the waveform of SRS transmission has the character of repeating in the time domain. Thus, dropping partial SRS transmission does not affect the detection of SRS transmission.

In one embodiment, the subframe boundaries between TDD eNB and FDD eNB have an offset, which is the same as the TDD special TA offset about 20 µs. In one example, considering the small difference between TDD eNB and FDD eNB, the overlap region of UL transmission may be close to the length of half CP. Dropping partial CP does not affect the detection of the OFDM symbol if remaining CP can cover the length of the maximum delay spread. Therefore, one straightforward method is dropping partial CP of the first OFDM symbol of next serving cell within the overlap region. In another example, considering the large difference between TDD eNB and FDD eNB, the overlap region of UL transmission may be close to the length of CP. Thus, dropping partial CP of the first OFDM symbol of next serving cell cannot cover the whole overlap region. Dropping partial tail of the last OFDM symbol of previous serving cell can be used to cover remaining overlap region. Similar to the theory of dropping partial CP, dropping partial tail does not affect the detection of the OFDM symbol if corresponding compensation is performed.

In above embodiments used for UL switching, dropping partial UL transmission is determined by the difference of UL TA values of the two serving cells. So, the difference of UL TA values shall be known by each serving eNBs. In one example, wherein the backhaul between serving cells is non-ideal, the mobile station calculates the difference of UL TA values and reports it to each serving eNB. In another example, wherein the backhaul between serving cells is ideal, serving eNBs shall exchange the UL TA value corresponding to the same mobile station to calculate the difference between two UL TA values.

FIG. 1 further shows simplified block diagrams of base stations 101, 102 and mobile station 103 in accordance with the current invention. Base station 101 has an antenna 156, which transmits and receives radio signals. A RF transceiver module 153, coupled with the antenna, receives RF signals from antenna 156, converts them to baseband signals and sends them to processor 152. RF transceiver 153 also converts received baseband signals from processor 152, converts them to RF signals, and sends out to antenna 156. Processor 152 processes the received baseband signals and invokes different functional modules to perform features in base station 101. Memory 151 stores program instructions and data 154 to control the operations of base station 101. Base station 101 also includes a set of control modules 155 that carry out functional tasks to communicate with mobile stations.

Similarly, base station 102 has an antenna 126, which transmits and receives radio signals. A RF transceiver module 123, coupled with the antenna, receives RF signals from antenna 126, converts them to baseband signals and sends them to processor 122. RF transceiver 123 also converts received baseband signals from processor 122, converts them to RF signals, and sends out to antenna 126. Processor 122 processes the received baseband signals and invokes different functional modules to perform features in base station 102. Memory 121 stores program instructions and data 124 to control the operations of base station 102. Base station 102 also includes a set of control modules 125 that carry out functional tasks to communicate with mobile stations.

Mobile station 103 has an antenna 136, which transmits and receives radio signals. A RF transceiver module 137, coupled with the antenna, receives RF signals from antenna 136, converts them to baseband signals and sends them to processor 132. RF transceiver 137 also converts received baseband signals from processor 132, converts them to RF signals, and sends out to antenna 136. Processor 132 processes the received baseband signals and invokes different functional modules to perform features in mobile station 103. Memory 131 stores program instructions and data 138 to control the operations of mobile station 103. Transceiver 137 of mobile station 103 includes two receivers 133 and 135 and one transmitter 134. Receiver 135 receives downlink transmissions from transceiver 153 of base station 101. Receiver 135 receives downlink transmissions from transceiver 123 of base station 102. On the uplink side, there is only one transmitter for mobile station 103, transmitter 134. Transmitter 134 transmits uplink signals to both base stations 101 and 102 sequentially.

Mobile station 103 also includes a set of control modules that carry out functional tasks. A selection module 191 selects a serving cell for an UL transmission subframe based on a selection rule. A TDM module 192 multiplexes the UL transmission subframe to the selected serving cell. An overlap handler 193 drops a selected part of the UL transmission within the overlap region based on one or more switching rules.

Serving Cell Selection

In one novel aspect, the method comprising: selecting one serving cell from multiple activated UL serving cells for UL transmission in one subframe; performing the UL transmission on the selected serving cell in the subframe.

In one example, wherein selecting one serving cell from multiple activated UL serving cells for UL transmission is based on semi-static TDM pattern; each serving cell is associated with one subframe set; the subframe set is predefined or configured by higher layer signaling; there is no overlap between any two subframe set; the unit set of all subframe sets includes each subframe; selecting the serving cell associated with the subframe set including current subframe.

In one example, wherein selecting one serving cell from multiple activated UL serving cells for UL transmission is based on dynamic TDM pattern; evaluating the priority of potential UL transmissions on each serving cell; the priority of potential UL transmission is predefined, e.g. PUSCH>SR>DL HARQ-ACK>periodic CSI>SRS>PRACH (triggered by eNB)>PRACH (triggered by UE); selecting the serving cell wherein corresponding UL transmission has the highest priority; evaluating the priority of these serving cells if potential UL transmissions on multiple serving cells have the same priority; the priority of each serving cell is predefined, e.g. PCell has the highest priority, and one SCell with small serving cell index has higher priority than another SCell with large serving cell index; selecting the serving cell with highest priority among these serving cells with the same priority of UL transmission.

In one example, wherein performing the UL transmission on the selected serving cell is related to the type of serving cell and the type of backhaul; if the backhaul between the serving cells is non-ideal, potential UL transmission on other serving cell is dropped; if the backhaul between the serving cells is ideal, potential UL transmission on other serving cell is carried by the UL transmission on the selected serving cell, e.g. DL HARQ-ACK; if the selected serving cell is PCell and the backhaul between PCell and SCell is ideal, PUCCH and PUSCH on the PCell can carry DL HARQ-ACK potentially transmitted on other SCell; if the selected serving cell is SCell and the backhaul between PCell and SCell is ideal, only PUSCH on the SCell can carry DL HARQ-ACK potentially transmitted on PCell.

Figure 2:
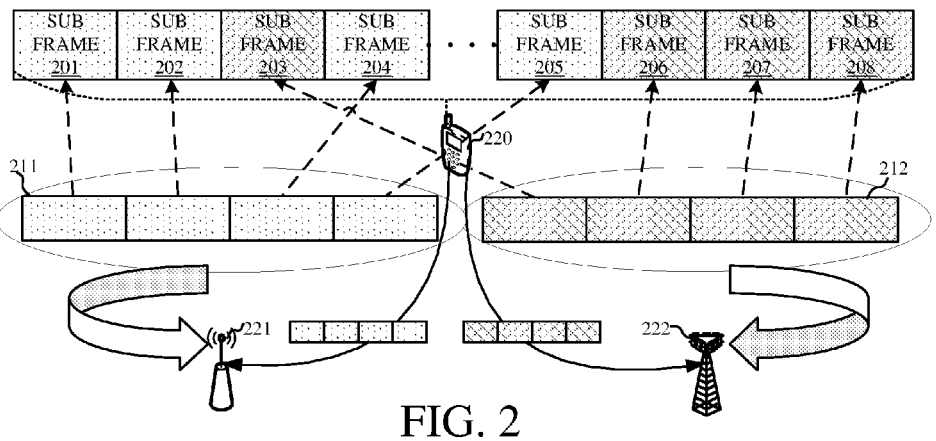
FIG. 2 illustrates an example of selecting one serving cell for UL transmission based on semi-static TDM pattern in accordance with embodiments of the present invention.

FIG. 2 illustrates an example of selecting one serving cell for UL transmission based on semi-static TDM pattern in accordance with embodiments of the present invention. In one embodiment of the disclosure, a method for a mobile station to select one serving cell for UL transmission includes: each activated serving cell is associated with one subframe set, for example serving cell 221 and 222 are respectively associated with subframe set 211 and 212, wherein the subframe set 211 includes subframes 201, 202, 203 and 204, and the subframe set 212 includes subframes 205, 206, 207 and 208; based on the subframe set associated with each serving cell, the mobile station 220 can determine one subframe set including current subframe and select corresponding serving cell for UL transmission. For example, for the subframes 201, 202, 203 and 204, the mobile station shall perform the UL transmission on the serving cell 221 associated with the subframe set 211.

In one embodiment, there is no overlap between the subframe set 211 and 212, and the union set of the subframe set 211 and 212 can include each subframe in one frame (not shown). The subframe set associated with each serving cell can be predefined or configured by higher layer signaling. A fixed or semi-static TDM pattern is performed for UL transmission. In addition, fixed or semi-static UL switching point is helpful to solve the problem of UL transmission overlap. For example, if UL transmission is switched to one TDD serving cell from one FDD serving cell, the UL switching point can be set close to the TDD special subframe. Due to no UL transmission in DwPTS and GP, UL transmission overlap issue can be avoided. In one embodiment, there can be more than two serving cells. The serving cell and the subframe set shall have the mapping relation of one-to-one.

Figure 3:
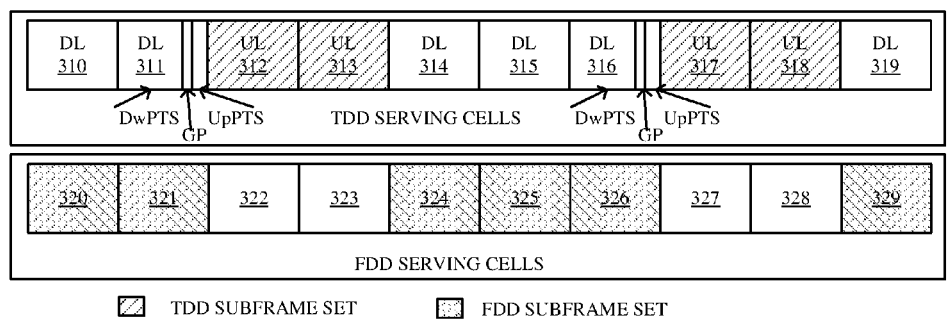
FIG. 3 illustrates an example of subframe set pattern for TDM UL transmission, wherein one serving cell is TDD cell and another serving cell is FDD cell.

FIG. 3 illustrates an example of subframe set pattern for TDM UL transmission, wherein one serving cell is TDD cell and another serving cell is FDD cell. Within the subframes 310-319 and 320-329, if SRS and PRACH are not configured for UpPTS of one special subframe, there is no UL transmission in UpPTS. The subframe set associated with the TDD serving cell comprises TDD-UL subframes of the TDD cell, such as subframes {312, 313, 317, 318} for the first DL-UL configuration. The subframe set associated with the FDD serving cell consists of the FDD-UL subframe corresponding to TDD-DL and TDD special subframe of the TDD cell, such as subframes {320, 321, 324, 325, 326, 329}.

Figure 4:
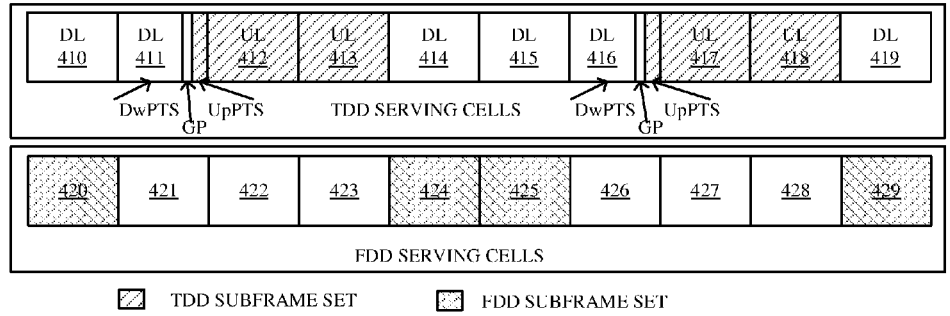
FIG. 4 illustrates an example of subframe set pattern for UL transmission, wherein one serving cell is TDD cell and another serving cell is FDD cell.

FIG. 4 illustrates an example of subframe set pattern for UL transmission, wherein one serving cell is TDD cell and another serving cell is FDD cell. If SRS and/or PRACH are configured in the UpPTS of one special subframe, there is possible UL transmission in UpPTS. Within the subframes 410-419 and 420-429, the subframe set associated with the TDD serving cell consist of TDD-UL subframes {412, 413, 417, 418} and UpPTS of the TDD cell {412, 416}, forming the set of subframes {411, 412, 413, 416, 417, 418} for the first UL-DL configuration. The subframe set associated with the FDD serving cell consist of the FDD-UL subframe corresponding to TDD-DL subframe of the TDD cell, such as subframes {420, 424, 425, 429}. In this case, there is a gap between the subframe sets corresponding to TDD serving cell and FDD serving cell, which is the time during DwPTS and GP. The gap shall be enough to cover the difference of UL TA values corresponding to TDD serving cell and FDD serving cell. Thus, there is no the problem of UL transmission overlap in the case.

Figure 5:
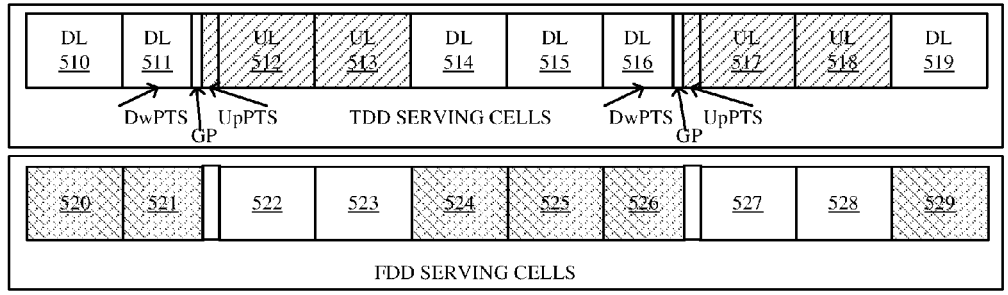
FIG. 5 illustrates an example of subframe set pattern for TDM UL transmission, wherein one serving cell is TDD cell and another serving cell is FDD cell.

FIG. 5 illustrates an example of subframe set pattern for TDM UL transmission, wherein one serving cell is TDD cell and another serving cell is FDD cell. Within subframes 510-519 and 520-529, if SRS and/or PRACH are configured in the UpPTS of special subframe, there is possible UL transmission in UpPTS. The subframe set associated with the TDD serving cell consists of TDD-UL subframes {512, 513, 517, 518} and UpPTS of the TDD cell {512, 516}, forming the subframe set of subframes {511, 512, 513, 516, 517, 518}. The subframe set associated with the FDD serving cell consists of the FDD-UL subframe corresponding to TDD-DL and TDD special subframe of the TDD cell, e.g. subframes {520, 521, 524, 525, 526, 529}. In this example, only partial OFDM symbols in subframes 511 and 516 can be used for UL transmission to avoid the overlap with the UL transmission in UpPTS on TDD serving cell. Similar to current DwPTS in TDD special subframe, DMRS pattern shall be revised to support the kind of special UL subframe. Besides the OFDM symbols corresponding to UpPTS, one additional OFDM symbol can be set blank to cover the difference of UL TA values corresponding to TDD serving cell and FDD serving cell.

Figure 6:
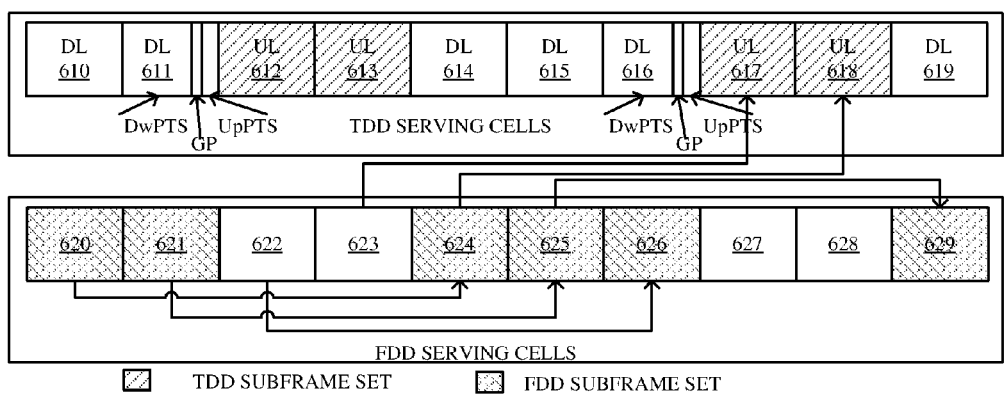
FIG. 6 illustrates an exemplary diagram of DL HARQ-ACK report of FDD serving cell with ideal back haul.

FIG. 6 illustrates an exemplary diagram of DL HARQ-ACK report of FDD serving cell with ideal backhaul. In above examples of subframe set pattern for TDM UL transmission, SR, SRS and PRACH shall be configured in associated subframe set for each serving cell. Within subframes 610-619 and 620-629, the mobile station shall monitor possible UL grant only for UL transmission within the subframe set. For the subframe out of the subframe set, corresponding UL grant do not need to be monitored. In addition, DL scheduling shall not be impacted by the subframe set pattern for UL transmission. If the backhaul between TDD serving cell and FDD serving cell is ideal, DL HARQ timing of FDD serving cell can follow the rules in FDD system and DL HARQ-ACK of FDD serving cell can be transmitted via UL transmission on TDD serving cell when corresponding UL transmission on FDD serving cell cannot be available. The DL HARQ-ACK for FDD subframes 623 and 624 of FDD serving cell are reported on subframes 617 and 618 of TDD serving cells, respectively. The DL HARQ-ACK for FDD subframe 625 of FDD serving cells is reported on subframe 629 of FDD serving cells.mobile station shall monitor possible UL grant only for UL transmission within the subframe set. For the subframe out of the subframe set, corresponding UL grant do not need to be monitored. In addition, DL scheduling shall not be impacted by the subframe set pattern for UL transmission. If the backhaul between TDD serving cell and FDD serving cell is ideal, DL HARQ timing of FDD serving cell can follow the rules in FDD system and DL HARQ-ACK of FDD serving cell can be transmitted via UL transmission on TDD serving cell when corresponding UL transmission on FDD serving cell cannot be available. The DL HARQ-ACK for FDD subframes 623 and 624 of FDD serving cell are reported on subframe subframes 617 and 618 of TDD serving cells, respectively. The DL HARQ-ACK for FDD subframe 625 of FDD serving cells is reported on subframe 629 of FDD serving cells.

Figure 7:
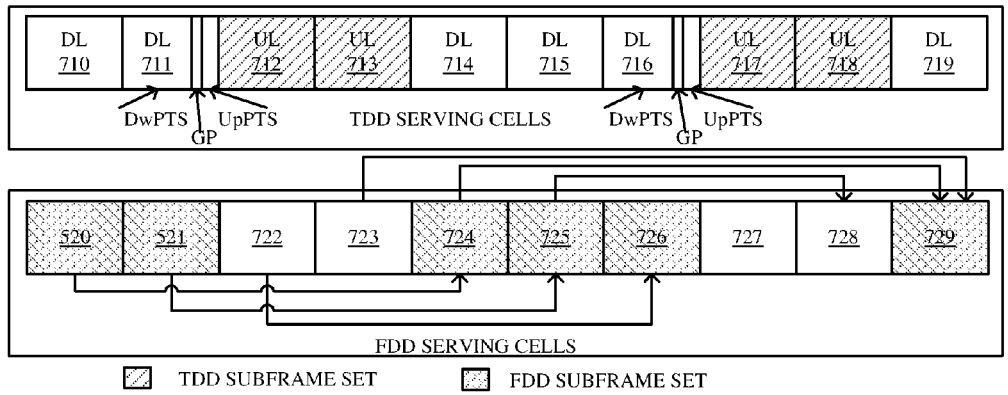
FIG. 7 illustrates an exemplary diagram of DL HARQ-ACK report of FDD serving cell with non-ideal back haul.

FIG. 7 illustrates an exemplary diagram of DL HARQ-ACK report of FDD serving cell with non-ideal backhaul. If the backhaul between TDD serving cell and FDD serving cell is non-ideal, one straightforward solution is that the DL HARQ-ACKs of subframes can be reported in the subframe set. Thus, the current mechanism of DL HARQ-ACK report in TDD system can be reused, e.g. multiple DL HARQ-ACKs are reported in the same subframe with ACK/NACK multiplexing or bundling. The DL HARQ-ACK for FDD subframes 723, 724 and 725 of FDD serving cells are reported on subframe 729 of FDD serving cell. As illustrated in FIG. 7, the DL HARQ-ACK shall be reported in the adjacent available subframe with timing interval larger than 4 ms.

In one novel aspect, the mobile station selects serving cells for UL transmission based on priority rules. In one embodiment, a method for a mobile station to select one serving cell for UL transmission includes evaluating the priority of potential UL transmission on each serving cell, such as PUSCH, SR, DL HARQ-ACK, periodic CSI, SRS and PRACH; the priority of potential UL transmission is predefined; selecting one serving cell wherein potential UL transmission has the highest priority; evaluating the priority of each serving cell if potential UL transmissions on multiple serving cells have the same priority; the priority of each serving cell is predefined or configured by higher layer signaling; selecting one serving cell with highest priority among these serving cells with the same priority of potential UL transmission; if the backhaul between serving cells is ideal, the UCI of other serving cell can be transmitted on the selected serving cell, otherwise, potential UL transmission on other serving cell is dropped.

Figure 8:
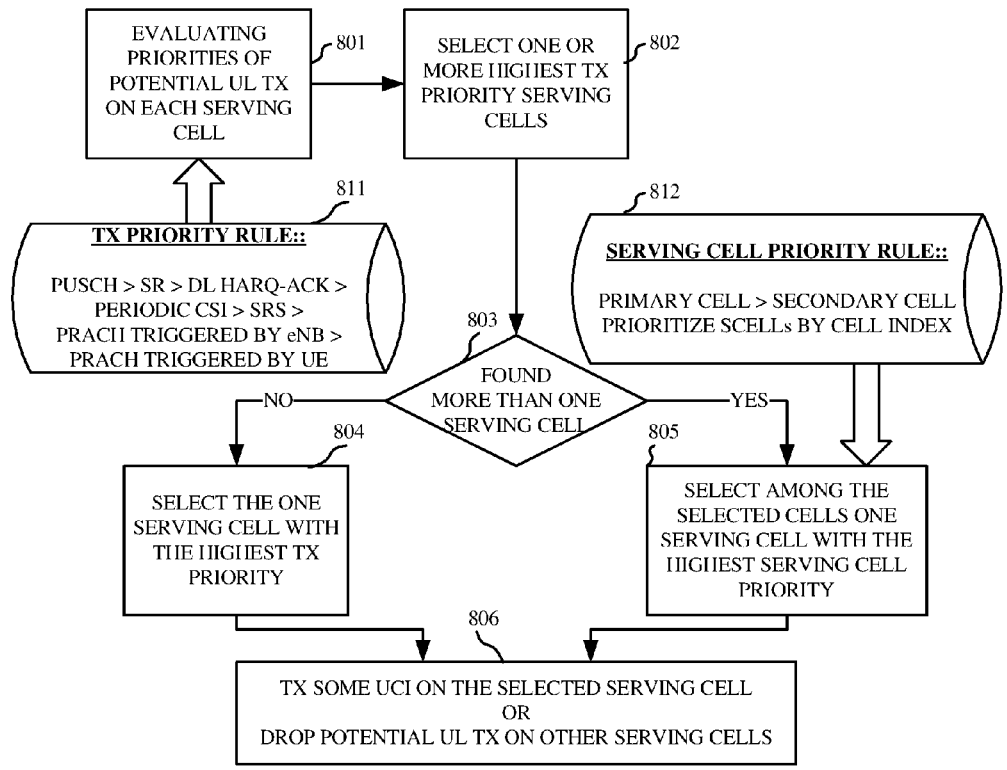
FIG. 8 illustrates an example of selecting one serving cell for UL transmission based on dynamic TDM pattern in accordance with embodiments of the present invention.

FIG. 8 illustrates an example of selecting one serving cell for UL transmission based on dynamic TDM pattern in accordance with embodiments of the present invention. At step 801, the mobile station evaluates priorities of potential UL transmission on each serving cell. During step 801, the mobile station applies a predefined transmission priority rule 811. In one embodiment, transmission priority rule 811 indicates a descending order of priority based on the type of transmission channel, for example, in descending order PUSCH, SR, DL HARQ-ACK, periodic CSI, SRS, PRACH (triggered by eNB), and PRACH (triggered by UE). Based on rule 811, at step 802, the mobile station selects one or more serving cells with the highest transmission priority. At step 803, the mobile station determines whether step 802 finds more than one serving cells. If step 803 finds only one serving cell with the highest transmission priority, the mobile station moves to step 804. At step 804, the mobile station selects the one serving cell with the highest transmission priority and moves to step 806. At step 806, the mobile station transmits the UCI of other non-selected serving cells on the selected serving cell if the backhaul is ideal, or drops potential UL transmission on other non-selected serving cells if the backhaul is non-ideal. If step 803 finds more than one highest transmission priority serving cells, the mobile station moves to step 805. At step 805, the mobile station selects one serving cell with the highest serving cell priority based on a serving-cell-priority rule among the selected serving cells at step 802. In one embodiment, serving-cell-priority rule 812 is a descending order of priority includes primary cell and secondary cells prioritized by cell index. In one embodiment, serving-cell-priority rule 812 further includes SCell with relatively small serving cell index has higher priority than other SCells. Upon selecting the serving cell at step 805, the mobile station moves to step 806, which transmits the UCI of other non-selected serving cells on the selected serving cell if the backhaul is ideal, or drops potential UL transmission on other non-selected serving cells if the backhaul is non-ideal.

In one embodiment, potential UL transmission on one serving cell includes PUSCH for data transmission, PUCCH for UCI transmission, such as SR, DL HARQ-ACK or periodic CSI, PRACH triggered by eNB or UE, and SRS, which can be multiplexed with PUSCH/PUCCH in one subframe. In a CA system with ideal backhaul, SR and PRACH triggered by UE can be transmitted only on PCell. In a dual connectivity (DC) system with non-ideal backhaul, SR and PRACH triggered by UE can be transmitted on each serving cell. In TDD or FDD CA system, PUCCH can be transmitted only on PCell. In TDD-FDD CA system, PUCCH can be transmitted on SCell to simplify DL HARQ issue of SCell. However, it is possible only one SCell is allowed to transmit PUCCH, and the SCell is configured by higher layer signaling or predefined, e.g. the SCell with smallest serving cell index and duplex mode different from PCell. DL HARQ-ACKs of some SCells with the same duplex mode as PCell can be transmitted via PCell PUCCH. DL HARQ-ACKs of other SCells can be transmitted via SCell PUCCH and these SCells have the same duplex mode. Among these potential UL transmissions, PUSCH has the highest priority since data transmission shall be firstly ensured. PRACH triggered by UE has the lowest priority. The descending order of priority for the UL transmission is PUSCH, SR, DL HARQ-ACK, periodic CSI, SRS, PRACH (triggered by eNB), and PRACH (triggered by UE). The priority of each serving cell is predefined or configured by higher layer signaling. In CA system with ideal backhaul, the PCell has the highest priority and the SCell with relatively small serving cell index has higher priority than other SCells. In DC system with non-ideal backhaul, the Master cell with RRC connection has the highest priority.

In yet another embodiment, if the backhaul between serving cells is ideal, such as a CA system, some UCI of other serving cell can be transmitted on the selected serving cell via PUCCH or PUSCH. If the selected serving cell is PCell, DL HARQ-ACK of SCell can be transmitted via PUCCH/PUSCH on the PCell. Existing PUCCH formats carrying DL HARQ-ACKs of multiple serving cells can be reused, e.g. format 1b with channel selection and format 3. The periodic CSI of SCell also can be transmitted via PUCCH/PUSCH on the PCell. If the selected serving cell is SCell, DL HARQ-ACK of PCell can be transmitted via PUSCH on the selected SCell. To ensure the robustness of DL transmission on PCell, PUCCH on SCell is not proposed to carry DL HARQ-ACK of PCell. However, the DL HARQ-ACK of other serving cells can be transmitted via PUCCH on the selected SCell, e.g. the SCell with the same duplex mode with the selected SCell. The mechanism of PUCCH on PCell can be directly reused for the PUCCH on SCell. Periodic CSI of other SCell can be transmitted via PUCCH/PUSCH on the selected SCell.

Drop Partial UL Transmission Within an Overlap Region

In one novel aspect, the method comprising: reporting the difference of UL TA values corresponding to the two serving cells to each serving cell if the backhaul between the two serving cells is non-ideal; dropping partial UL transmission within an overlap region of UL transmission during UL switching.

In one example, wherein the subframe boundaries at TDD eNB and FDD eNB are synchronous; the overlap region of UL transmission is close to the length of one OFDM symbol; mapping the UL transmission of previous serving cell to partial subframe except the last OFDM symbol; blanking the last OFDM symbol of previous serving cell is predefined or configured by higher layer signaling; dropping the blank OFDM symbol within the overlap region.

In one example, wherein the subframe boundaries at TDD eNB and FDD eNB are synchronous; the overlap region of UL transmission is close to half or one third of the length of one OFDM symbol; the last OFDM symbol of previous serving cell is configured for SRS with comb pattern; dropping partial SRS transmission within the overlap region.

In one example, wherein the subframe boundaries at TDD eNB and FDD eNB have an offset which is the same as the TDD special TA offset; the overlap region of UL transmission is closed to the length of half CP; dropping partial CP of the first OFDM symbol of next serving cell within the overlap region.

In one example, wherein the subframe boundaries at TDD eNB and FDD eNB have an offset which is the same as the TDD special TA offset; the overlap region of UL transmission is close to the length of CP; dropping partial tail of the last OFDM symbol of previous serving cell within the overlap region and the length of dropped tail is signaled by serving eNB; dropping partial CP of the first OFDM symbol of next serving cell within the overlap region.

Figure 9:
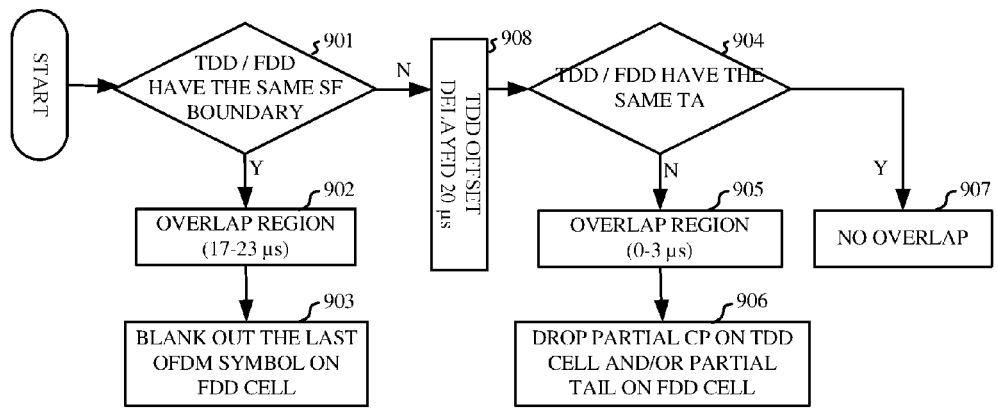
FIG. 9 shows an exemplary flow chart for the mobile station to drop portion of OFD symbol in the overlapping region in accordance with embodiments of the current invention.

FIG. 9 shows an exemplary flow chart for the mobile station to drop a portion of OFDM symbol in the overlapping region in accordance with embodiments of the current invention. At step 901, the mobile station checks whether the subframe boundaries of TDD and FDD are synchronous. If step 901 finds the subframe boundaries of TDD and FDD are synchronous, the mobile station moves to step 902 and estimates the overlapping region between the FDD and TDD cells. The overlapping region will be within 17~23 µs considering a TDD special TA offset of 20 us and ±3 us TA offset caused by propagation distance, e.g. there is about 500 m difference for the distances of the mobile station to the FDD eNB and to the TDD eNB. The mobile station moves to step 903, which blanks out the last OFDM symbol on the FDD cell. If step 901 finds that the subframe boundaries of TDD and FDD are non-synchronous, it moves to step 908, which determines that there is 20 µs offset at the subframe boundaries of the TDD and FDD eNB, i.e. subframe boundary of the TDD eNB is delay by 20 us. The mobile station moves to step 904 to check whether the FDD and TDD cells have the same time advance (TA) value, wherein the TA value doesn't include the TDD special offset of 20 us, i.e. totally caused by propagation distance. If step 904 finds that the TDD and FDD cells have the same TA value, the mobile station moves step 907, which determines that there is no overlapping region. If step 904 finds that the TA values to TDD and FDD cells are different, the mobile station moves step 905, which estimates the overlapping region between the FDD and TDD cells. The overlapping region will be within 0~3 µs considering ±3 us TA offset caused by propagation distance, e.g. there is about 500 m difference for the distances of the mobile station to the FDD eNB and to the TDD eNB. The mobile station moves to step 906 following step 905. At step 906, the mobile station drops partial CP on the TDD cell and/or partial tail on the FDD cell.

Figure 10:
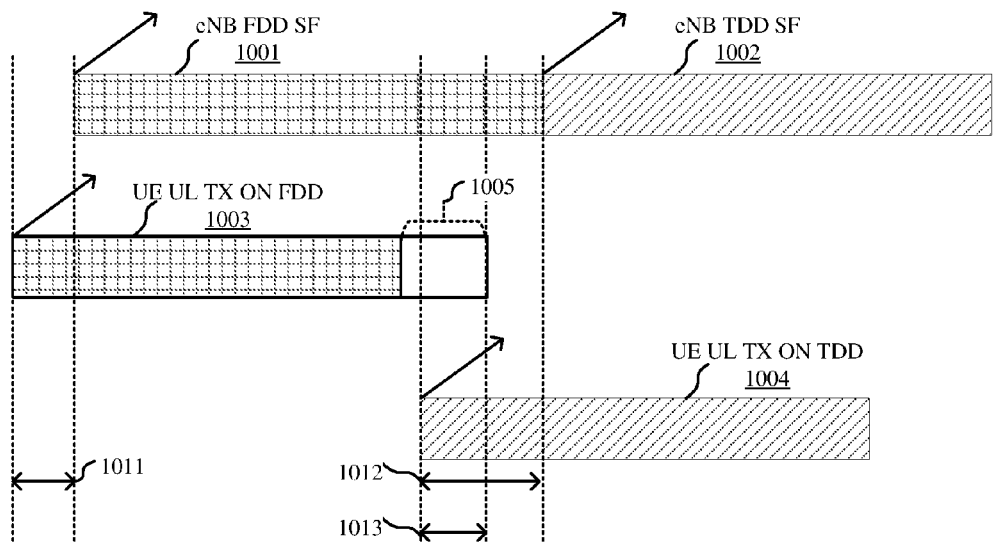
FIG. 10 illustrates an example of dropping partial UL transmission within an overlap region by blanking out the last OFDM symbol in accordance with embodiments of the present invention.

FIG. 10 illustrates an example of dropping partial UL transmission by blanking out the last OFDM symbol within an overlap region in accordance with embodiments of the present invention. A mobile station is served by one FDD serving cell and one TDD serving cell, and the boundary of FDD subframe 1001 for FDD serving cell and TDD subframe 1002 for the TDD serving cell is the same, in one example, the tail boundary of FDD subframe 1001 for FDD serving cell and starting boundary of TDD subframe 1002 for the TDD serving cell is the same, in other words, simultaneously DL receiving and TDM UL transmission 'TA1' 1011 is the UL TA value caused by the propagation distance from the FDD serving cell to the UE UL transmission on FDD 1003. 'TA3' is the UL TA value caused by the propagation distance from the TDD serving cell to the UE UL transmission on TDD 1004. 'TA_offset' means TDD special UL TA offset used for the switching time from UL to DL at TDD eNB side and the value is 624 basic time unit about 20 µs. 'TA2' 1012 is the total UL TA value for a mobile station to adjust the timing of UL transmission on the TDD serving cell, equal to TA3+TA_offset. Due to different UL TA values, when the mobile station switches UL transmission from FDD serving cell to TDD serving cell, there is an overlap region 1013 of UL transmission. The length of the overlap region 1013 is the difference of UL TA values corresponding to FDD serving cell and TDD serving cell, which is 'TA2−TA1'.

In one embodiment of the disclosure, a method for a mobile station to drop partial UL transmission within an overlap region includes the last OFDM symbol 1005 of the serving cell with relatively small UL TA value is configured for blank; mapping UL transmission to partial subframe except the last OFDM symbol.

In one embodiment, the subframe boundaries at TDD eNB and FDD eNB are synchronous. Considering TDD special TA offset about 20 μs, UL TA value corresponding to TDD serving cell shall be larger than FDD serving cell. When UL transmission is switched to TDD serving cell from FDD serving cell, there is an overlap region 1013 of UL transmission, which is the difference of UL TA values corresponding to TDD serving cell and FDD serving cell. Considering large distance between TDD eNB and FDD eNB, the overlap region may be close to the length of one OFDM symbol. The last OFDM symbol of FDD serving cell can be configured for blank to avoid UL transmission overlap. The mobile station with TDM UL transmission can perform UL transmission similarly with the case that the last OFDM symbol is configured for SRS transmission. For example, the physical resource mapped to PUSCH does not include the last OFDM symbol, and PUCCH adopts shorter length of orthogonal sequence for spreading in the time domain, such as PUCCH format 1/1a/1b and format-3. Since PUCCH 2/2a/2b cannot be multiplexed with SRS in the same subframe, periodic CSI is not proposed to configure on the subframe wherein UL switching may happen.

For legacy UE and other UE with multiple transmitters, PUCCH transmission adopts normal length of orthogonal sequence for spreading in the time domain. The orthogonal sequences with different lengths cannot ensure the orthogonality between multiple PUCCH. Thus, the detection performance of PUCCH may be impacted due to the break of orthogonality. Therefore, the PUCCHs with different length of orthogonal sequence are not proposed multiplexed within one PRB via PUCCH resource scheduling, e.g. explicit resource allocation for PUCCH format-3, and CCE index based implicit resource allocation for PUCCH format 1/1a/1b.

Figure 11:
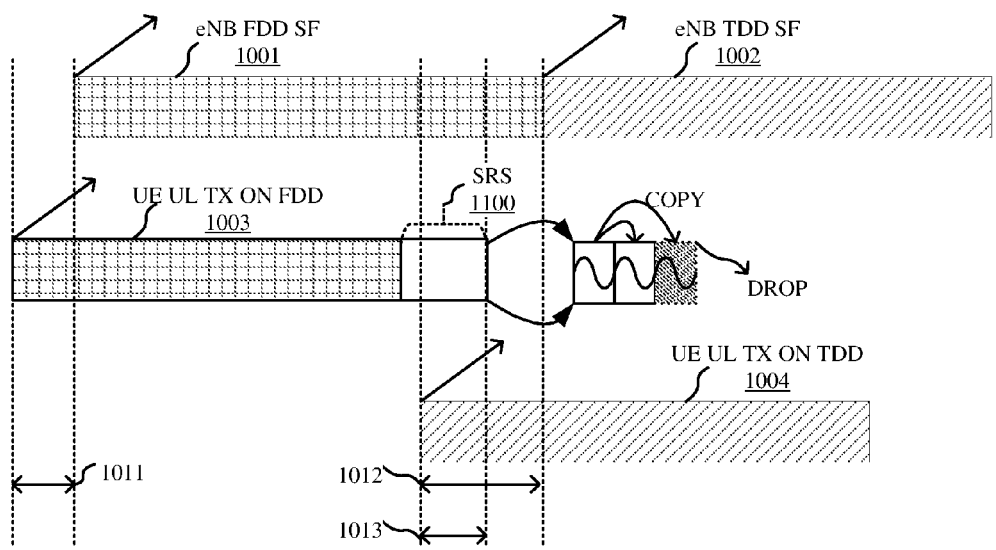
FIG. 11 illustrates an example of dropping partial UL transmission within an overlap region by dropping the last OFDM symbol configured for SRS with combing structure in accordance with embodiments of the present invention.

FIG. 11 illustrates an example of dropping partial UL transmission within an overlap region by dropping the last OFDM symbol configured for SRS with combing structure in accordance with embodiments of the present invention. In FIG. 11, 'TA1' 1011 is the UL TA value caused by the propagation distance from the FDD serving cell to the UE UL transmission on FDD 1003. 'TA3' is the UL TA value caused by the propagation distance from the TDD serving cell to the UE UL transmission on TDD 1004. 'TA_offset' means TDD special UL TA offset used for the switching time from UL to DL at TDD eNB side and the value is 624 basic time unit about 20 μs. 'TA2' 1012 is the total UL TA value for a mobile station to adjust the timing of UL transmission on the TDD serving cell, equal to TA3+TA_offset'. The length of the overlap region 1013 is the difference of UL TA values corresponding to FDD serving cell and TDD serving cell, which is 'TA2−TA1'.

In one embodiment of the disclosure, a method for a mobile station to drop partial UL transmission within an overlap region includes the last OFDM symbol of the serving cell with relatively small UL TA value is configured for SRS with comb pattern; dropping partial SRS transmission within the overlap region.

In one embodiment, subframe boundaries at TDD subframe 1001 from TDD eNB and subframe 1002 from TDD eNB are synchronous. Considering TDD special TA offset about 20 μs, UL TA value corresponding to TDD serving cell shall be larger than FDD serving cell. When UL transmission is switched to TDD serving cell from FDD serving cell, there is an overlap region of UL transmission and corresponding length is the difference of UL TA values corresponding to TDD serving cell and FDD serving cell. Considering relatively small distance of TDD eNB and FDD eNB, the overlap region may be close to half or one third of the length of one OFDM symbol. The last OFDM symbol 1100 of FDD serving cell is configured for SRS with comb pattern. Since SRS with comb pattern has the character of down-sampling in the frequency domain, the wave form of SRS in the time domain has the character of repeat. For example, SRS is configured with an interval of 3 subcarriers, the wave form of SRS in the time domain has three repeats. If the last repeat within the overlap region is dropped, detection performance of SRS is not seriously impacted. Therefore, the configuration of interval for comb pattern shall be ensured to at least one repeat is retained if partial SRS is dropped.

Figure 12:
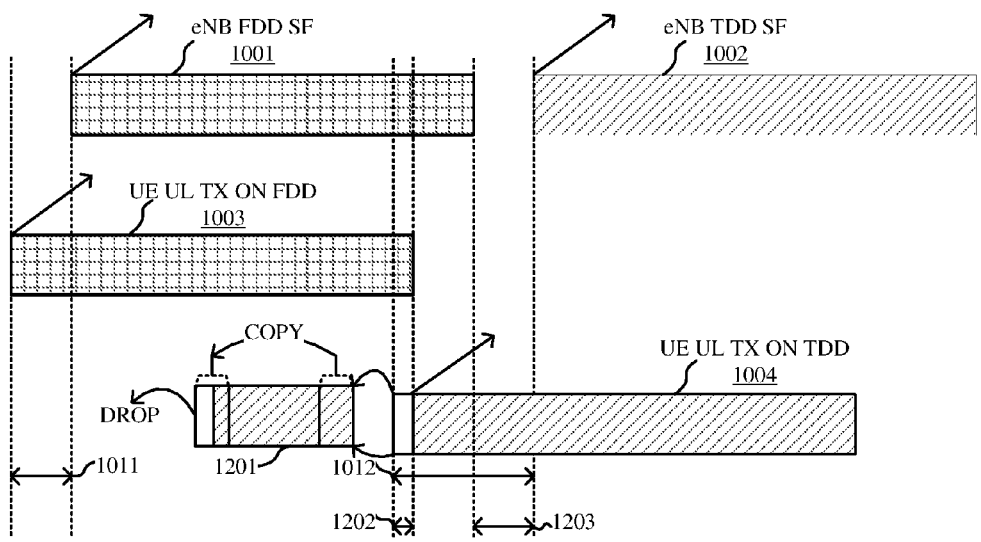
FIG. 12 illustrates an example of dropping partial UL transmission within an overlap region dropping partial CP of the first OFDM symbol in accordance with embodiments of the present invention.

FIG. 12 illustrates an example of dropping partial UL transmission within an overlap region dropping partial CP of the first OFDM symbol in accordance with embodiments of the present invention. In FIG. 12, 'TA1' 1011 is the UL TA value caused by the propagation distance from the FDD serving cell to the UE UL transmission on FDD 1003. 'TA3' is the UL TA value caused by the propagation distance from the TDD serving cell to the UE UL transmission on TDD 1004. 'TA_offset' means TDD special UL TA offset used for the switching time from UL to DL at TDD eNB side and the value is 624 basic time unit about 20 μs. 'TA2' 1012 is the total UL TA value for a mobile station to adjust the timing of UL transmission on the TDD serving cell, equal to TA3+TA_offset'. But different from FIG. 10 and FIG. 11, the length of the overlap region 1202 is the difference of UL TA values corresponding to FDD serving cell and TDD serving cell, which is 'TA3−TA1'.

In one embodiment of the disclosure, a method for a mobile station to drop partial UL transmission within an overlap region includes dropping partial CP of the first OFDM symbol of the serving cell with relatively large UL TA value. In one embodiment, the subframe boundaries between TDD eNB and TDD eNB have an offset, which is the same as the value of TDD special TA offset 1203, i.e. 624 basic time units about 20 μs. Thus, the overlap region mainly consists of the difference of UL TA values caused by different propagation distances. Considering relatively small distance between TDD eNB and FDD eNB, the overlap region 1202 may be much less than CP length. After dropping partial CP within the overlap region, remaining CP can still cover the maximum delay spread. Thus, the detection performance of the OFDM symbol is not impacted. The behavior of dropping partial CP can be predefined or configured by eNB. Since the maximum delay spread for UL transmission is estimated at eNB side, the eNB shall judge whether dropping partial CP impacts the detection of the OFDM symbol or not. If remaining CP cannot cover the maximum delay spread, dropping partial CP will affect the detection performance of the OFDM symbol. Thus, other methods shall be used to solve the problem of UL transmission overlap, e.g. dropping partial tail of the last OFDM symbol of previous subframe within the overlap region.

Figure 13:
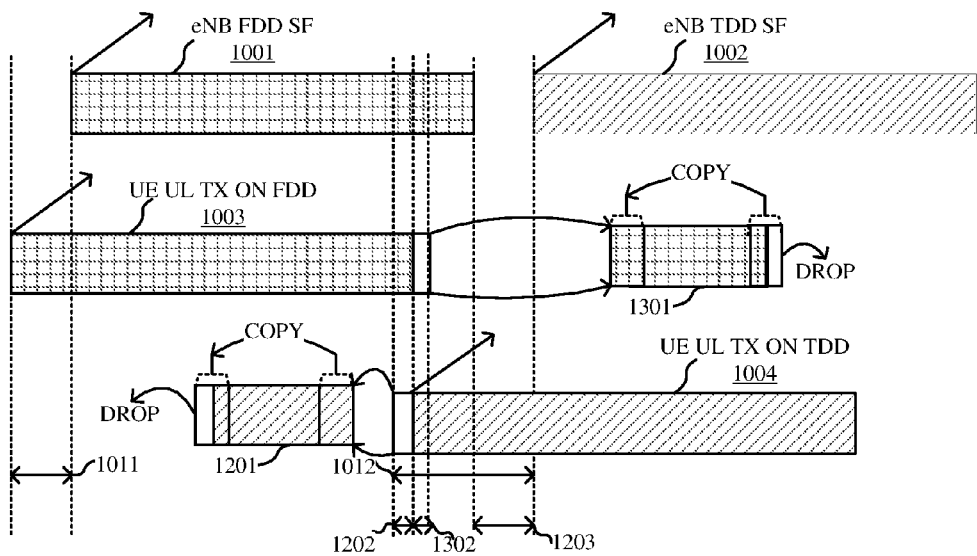
FIG. 13 illustrates an example of dropping partial UL transmission by dropping partial tail of the last OFDM symbol on one serving cell and partial CP of the first OFDM symbol of next subframe on another serving cell within an overlap region in accordance with embodiments of the present invention.

FIG. 13 illustrates an example of dropping partial UL transmission by dropping partial tail of the last OFDM symbol on one serving cell and partial CP of the first OFDM symbol on another serving cell within an overlap region in accordance with embodiments of the present invention. In FIG. 13, 'TA1' 1011 is the UL TA value caused by the propagation distance from the FDD serving cell to the UE UL transmission on FDD 1003. 'TA3' is the UL TA value caused by the propagation distance from the TDD serving cell to the UE UL transmission on TDD 1004. 'TA_offset' means TDD special UL TA offset used for the switching time from UL to DL at TDD eNB side and the value is 624 basic time unit about 20 μs. 'TA2' 1012 is the total UL TA value for a mobile station to adjust the timing of UL transmission on the TDD serving cell, equal to TA3+TA_offset'. But different from FIG. 10 and FIG. 11, the length of the overlap region 1302 is the difference of UL TA values corresponding to FDD serving cell and TDD serving cell, which is 'TA3-TA1'. The overlap region 1302 is larger than the overlap region 1202 in FIG. 12, and it cannot be covered by dropping partial CP. Therefore, dropping partial tail of the last OFDM symbol on FDD serving cell is possible.

In one embodiment of the disclosure, a method for a mobile station to drop partial UL transmission within an overlap region includes dropping partial tail of the last OFDM symbol of the previous subframe within the overlap region; dropping partial CP of the first OFDM symbol of the next subframe within the overlap region.

In one embodiment, the subframe boundaries at TDD eNB and FDD eNB have an offset 1302, which is the same as the value of TDD special TA offset, i.e. 624 basic time units about 20 μs. Thus, the overlap region mainly consists of the difference of UL TA values corresponding to different propagation distances. Considering relatively large distance between TDD eNB and FDD eNB, the overlap region of UL transmission may be close to CP length. Dropping partial CP of the first OFDM symbol of the next subframe within the overlap region may be not enough to cover the overlap region. As shown in 1301, similar to partial CP dropping of 1201, dropping partial tail of one OFDM symbol does not affect the detection performance of the OFDM symbol if corresponding compensation is performed. The receiver shall shift the boundary of the OFDM symbol towards to CP to do OFDM demodulation and then multiply a phase rotation to recover the data in the frequency domain. The length of shifted boundary towards to CP is the same as the dropped tail, and the phase rotation is determined by the length of dropped tail. Therefore, the eNB shall align with the mobile station on the understanding of the length of dropped tail. In one example, the length of dropped tail is signaled by serving eNB.

Figure 14:
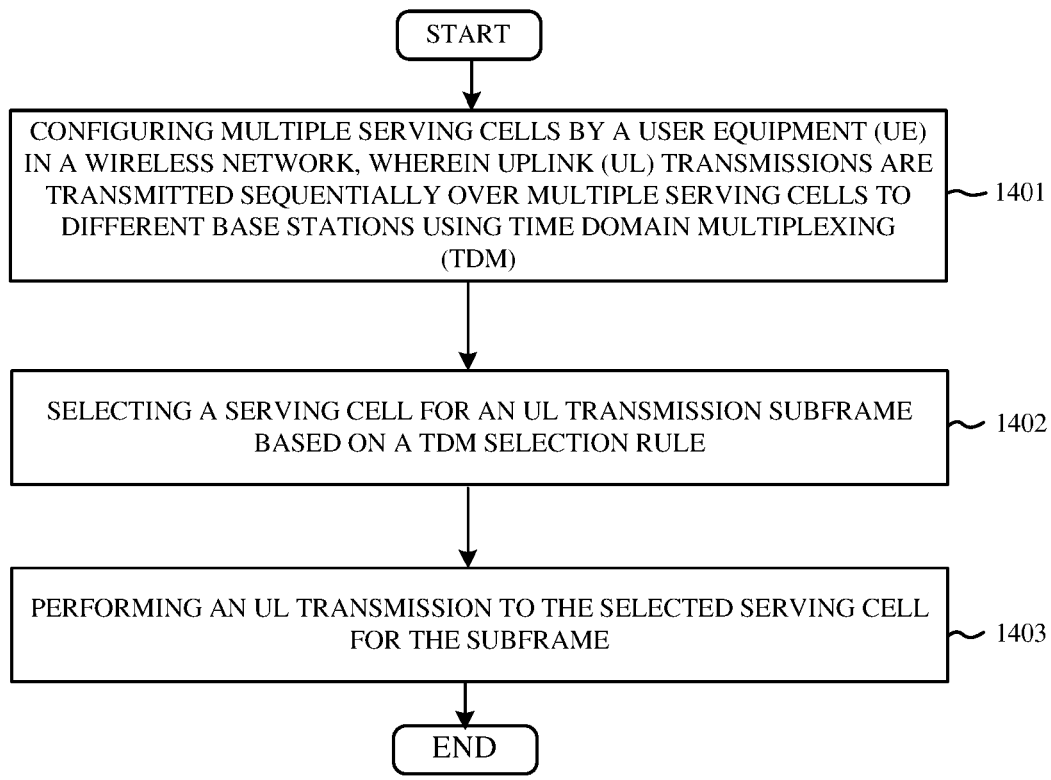
FIG. 14 shows an exemplary flow chart of the mobile station selecting a serving cell for uplink transmission based on the TDM selection rule.

FIG. 14 shows an exemplary flow chart of the mobile station selecting a serving cell for uplink transmission based on the TDM selection rule. At step 1401, the mobile station is configured with multiple serving cells, wherein uplink (UL) transmissions are transmitted sequentially over multiple serving cells to different base stations using time domain multiplexing (TDM). At step 1402, the mobile station selects a serving cell for an UL transmission subframe based on a TDM selection rule. At step 1403, the mobile station performs an UL transmission to the selected serving cell for the subframe.

Figure 15:
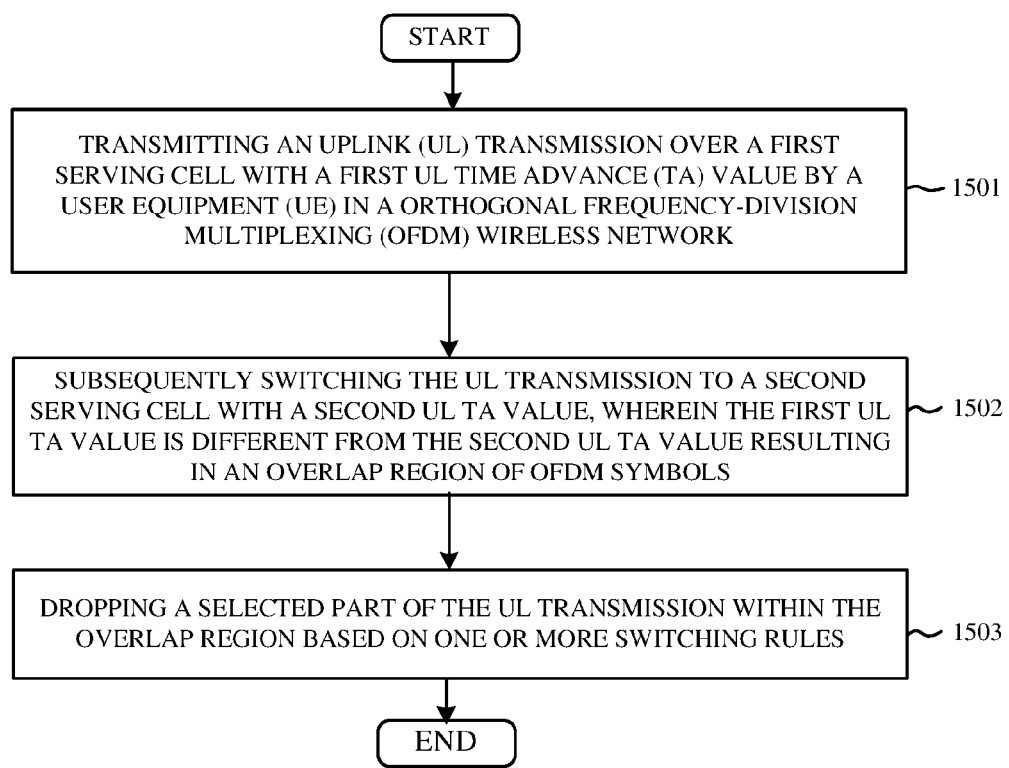
FIG. 15 shows and exemplary flow chart of the mobile station dropping a selected part of the uplink transmission within the overlapped region based on switching rules.

FIG. 15 shows and exemplary flow chart of the mobile station dropping a selected part of the uplink transmission within the overlapped region based on switching rules. At step 1501, the mobile station transmits an uplink (UL) transmission over a first serving cell with a first UL time advance (TA) value. At step 1502, the mobile station subsequently switches the UL transmission to a second serving cell with a second UL TA value, wherein the first UL TA value is different from the second UL TA value resulting in an overlap region of OFDM symbols. At step 1503, the mobile station drops a selected part of the UL transmission within the overlap region based on one or more switching rules.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

The invention claimed is:

1. A method comprising:
activating multiple serving cells by a user equipment (UE) in a wireless network, wherein uplink (UL) transmissions are transmitted sequentially over the multiple serving cells to different base stations using time domain multiplexing (TDM);
selecting a serving cell for an UL transmission subframe based on a TDM selection rule; and
performing an UL transmission to the selected serving cell for the subframe,
wherein the TDM selection rule is semi-static involving:
associating each serving cell with a corresponding subframe set consisting of one or more UL transmission subframes; and
selecting the serving cell associated with the UL transmission subframe for the UL transmission.

2. The method of claim 1, wherein the subframe set associated with a TDD serving cell consists of TDD-UL subframes of the TDD serving cell, and the subframe set associated with a FDD serving cell consists of the rest of the subframes.

3. The method of claim 1, wherein there each UL transmission subframe belongs to one and only one subframe set.

4. The method of claim 1, wherein the subframe sets are configured by an upper layer signaling.

5. A method comprising:
activating multiple serving cells by a user equipment (UE) in a wireless network, wherein uplink (UL) transmissions are transmitted sequentially over the multiple serving cells to different base stations using time domain multiplexing (TDM);
selecting a serving cell for an UL transmission subframe based on a TDM selection rule; and
performing an UL transmission to the selected serving cell for the subframe, wherein the TDM selection rule is dynamic involving:
identifying one or more serving cells with a highest UL transmission priority for the UL transmission subframe;
selecting a serving cell with the highest UL transmission priority if there is only one identified serving cell; and
selecting a serving cell with a highest serving cell priority among the identified serving cells if there are multiple serving cells with the highest UL transmission priority.

6. The method of claim 5, wherein the UL transmission priorities are predefined with descending order comprising: PUSCH, SR, DL HARQ-ACK, periodic CSI, SRS, PRACH triggered by a base station, and PRACH triggered by the UE.

7. The method of claim 5, wherein the serving cell priorities are predefined, wherein a primary cell (PCELL) has the highest priority, and wherein a secondary cell (SCELL) with small serving cell index has a higher priority than an SCELL with a bigger serving cell index.

8. An user equipment (UE), comprising:
a plurality of receivers that receive radio frequency signals from a plurality of serving cells corresponding to a plurality of base stations in a wireless network;
a transmitter that transmits radio frequency signals to the plurality of serving cells;
a selection module that selects a serving cell for an UL transmission subframe based on a selection rule; and
a time domain multiplexing (TDM) module that multiplexes the UL transmission subframe to the selected serving cell,
wherein the selection rule is semi-static involving:
associating each serving cell with a corresponding subframe set consisting of one or more UL transmission subframes; and
selecting the serving cell associated with the UL transmission subframe for the UL transmission.

9. The UE of claim 8, wherein the subframe set associated with a TDD serving cell consists of TDD-UL subframes of the TDD serving cell, and the subframe set associated with a FDD serving cell consists of the rest of the subframes.

10. The UE of claim 8, wherein there each UL transmission subframe belongs to one and only one subframe set.

11. The UE of claim 8, wherein the subframe sets are configured by an upper layer signaling.

12. An user equipment (UE), comprising:
a plurality of receivers that receive radio frequency signals from a plurality of serving cells corresponding to a plurality of base stations in a wireless network;
a transmitter that transmits radio frequency signals to the plurality of serving cells;
a selection module that selects a serving cell for an UL transmission subframe based on a selection rule; and
a time domain multiplexing (TDM) module that multiplexes the UL transmission subframe to the selected serving cell,
wherein the TDM selection rule is dynamic involving:
identifying one or more serving cells with a highest UL transmission priority for the UL transmission subframe;
selecting a serving cell with the highest UL transmission priority if there is only one identified serving cell; and
selecting a serving cell with a highest serving cell priority among the identified serving cells if there are multiple serving cells with the highest UL transmission priority.

13. The UE of claim 12, wherein the UL transmission priorities are predefined with descending order comprising: PUSCH, SR, DL HARQ-ACK, periodic CSI, SRS, PRACH triggered by a base station, and PRACH triggered by the UE.

14. The UE of claim 12, wherein the serving cell priorities are predefined, wherein a primary cell (PCELL) has the highest priority, and wherein a secondary cell (SCELL) with small serving cell index has a higher priority than an SCELL with a bigger serving cell index.

* * * * *